United States Patent [19]

Miyoshi

[11] Patent Number: 5,060,122
[45] Date of Patent: Oct. 22, 1991

[54] LAMP MOUNTING STRUCTURE FOR BUMPER

[75] Inventor: Kenichi Miyoshi, Machida, Japan

[73] Assignee: Nissan Motor Co., Ltd., Yokohama, Japan

[21] Appl. No.: 654,189

[22] Filed: Feb. 12, 1991

[30] Foreign Application Priority Data

Feb. 13, 1990 [JP] Japan .............................. 2-11901[U]

[51] Int. Cl.$^5$ ............................................. B60Q 1/00
[52] U.S. Cl. ................................................... 362/82
[58] Field of Search .............................. 362/82, 81, 83

[56] References Cited

U.S. PATENT DOCUMENTS 3,196,265 7/1965 Schneider .............................. 362/82

Primary Examiner—Carroll B. Dority
Attorney, Agent, or Firm—Foley & Lardner

[57] ABSTRACT

A lamp mounting structure for a bumper of an automobile is disclosed. The structure includes a concave portion formed in a surface member of the bumper for receiving the lamp therein. The concave portion having a base part at a bottom thereof in which an opening is formed. The lamp has a lamp mounting portion having a configuration to be fitted into the opening is protrudingly formed on a rear side thereof, and the lamp mounting portion has upper and lower plate parts each having a flat outer surface. Upper and lower rib members are protrudingly formed on the rear surface of the base part of the concave portion along upper and lower edges of the base part which define the opening. The upper and lower rib members are so arranged as to come into contact with the outer surfaces of the upper and lower plates parts of the lamp mounting portion, respectively, when the lamp is inserted into the convave portion. The lamp thus constituted is fixed to the concave portion with bolts.

12 Claims, 3 Drawing Sheets

LAMP MOUNTING STRUCTURE FOR BUMPER

BACKGROUND OF THE INVENTION

1. Field of the Invention

The present invention relates to a lamp mounting structure to a bumper of an automobile, in particular to a structure for mounting a lamp such as side marker or the like to a side section of a bumper which is attached to a body of an automobile in the vicinity of a wheel housing thereof.

2. Description of the Prior Art

One of the conventional lamp mounting structures for a bumper of an automobile is illustrated in FIGS. 1 to 3.

In FIG. 1, the reference numeral 1 denotes a bumper of an automobile. The bumper 1 comprises an armature (not shown in the drawings) which acts as a reinforcing member of the bumper 1 and a bumper facer 2, which is a facing member of the bumper 1, attached onto the armature. The left and right side sections 1a of the bumper 1 are bent inwardly, respectively. The bumper 1 having the above configuration is mounted to a body 4 of the automobile in such a manner that each of the left and right side sections 1a are directed to left and right wheel housings 3 of the automobile, respectively. Accordingly, when the bumper 1 is mounted to the body 4, the upper side 2a of the bumper facer 2 at each of the left and right side sections 1a of the bumper 1 is joined to a fender panel 5 as shown in FIG. 2 and the back end portion 2b thereof faces the wheel housing 3, respectively.

In each of the back end portions 2b of the facer 2, there is formed an elongated concave portion 7. The concave portion 7 has a base part 7a at the bottom thereof. In the base part 7a, there are formed two mounting holes 8 with a certain space therebetween and an opening 9 between the mounting holes 8. In the concave portion 7 having the above structure, a lamp 10 such as a side marker having a configuration similar to that of the concave portion 7 is installed.

The lamp 10 includes a base plate portion 11 and a bulb 12 supported on the base plate portion 11. A wiring harness 13 which extends into the inside of the body 4 through the opening 9 is connected to the bulb 12 of the lamp 10. On the rear surface 11a of the base plate portion 11 of the lamp 10, there are integrally formed two bosses 14, which serve as mounting seats of the lamp 10. The bosses 14 are arranged on the rear surface 11a of the base plate portion 11 so as to correspond to the positions of the mounting holes 8 formed in the base part 7a of the concave portion 7, and each of the bosses 14 has an axial screw hole 14a. In addition, on the rear surface 11a of the base plate portion 11, a rectangular tubular portion 15 which covers the opening 9 is protrudingly formed between the bosses 14 so as to surround the wiring harness 13. The protruding length of the tubular portion 15 is the same as that of each boss 14. Accordingly, the lamp 10 is mounted to the concave portion 7 of the bumper facer 2 by inserting the lamp 10 into the concave portion 7 from the rear side thereof, aligning the screw holes 14a of the bosses 14 to the mounting holes 8 of the base part 7a, and then screwing screws 16 into the screw holes 14a of the bosses 14 through the mounting holes 8 from the rear of the base part 7a.

In the meantime, around the wheel housing 3, a portion of a quantity of muddy water W which is splashed out from the inside of the wheel housing 3 is liable to enter the inside of the fender panel 5 through very small gaps in the wheel housing 3. Therefore, according to the conventional lamp mounting structure as described above, there is a case that the muddy water W entered into the fender panel 5 is transmitted to the inner surface of the bumper facer 2 and flows down as far the rear portion of the concave portion 7 of the bumper facer 2, as illustrated in FIG. 2. The muddy water W then enters the concave portion 7 from the opening 9 formed in the base part 7a, because the end of the tubular portion 15, though it covers the opening 9, simply contacts the base part 7a at the periphery of the opening 9. Namely, the conventional structure is not enough to prevent the muddy water from entering the concave portion 7. The muddy water entered into the concave portion 7 then flows out to reach the outer surface of the bumper facer 2, and therefore soils the outer surface of the bumper facer 2.

In view of this, as shown in FIG. 2, it is proposed that a rubber gasket 17 is interposed between the lower surface of the tubular portion 15 and the inner surface of the concave portion 7. However, the use of this rubber gasket 17 increases the number of parts used, so that this is a disadvantage in assembly process and manufacturing cost.

In addition, in the conventional structure the positioning accuracy of the lamp 10 with respect to the concave portion 7 is determined by the relationship between the mounting holes 8 and the screws 16 which are screwed into the screw holes 14a of the bosses 14, so that the diameter of the mounting hole 13 cannot be much greater than that of the screw 16. Specifically, if the diameter of the mounting hole 8 is fairly large with respect to the diameter of the screw 16, the space between the lamp 10 and the concave portion 7 is liable to be not uniform (in particular, the vertical spaces S in FIG. 3, which is very conspicuous from the outside). This has an adverse effect on the outer appearance ends of the automobile and detracts from the image of quality. In this case, if the positioning accuracy of the lamp 10 in the concave portion 7 is improved by merely reducing the diameter of each mounting hole 8, it becomes extremely difficult to line up the mounting hole 9 with the screw holes 14a of the bosses 14 and then insert the screws 16 to the mounting holes 8. This is another disadvantage from the aspect of mounting operability.

SUMMARY OF THE INVENTION

In view of the above disadvantages, a main object of the present invention is to provide an improved lamp mounting structure to a bumper, in which muddy water inside the bumper does not reach the outer surface a facing member of the bumper and the positioning accuracy of the lamp with respect to a concave portion formed in the facing member can be effectively obtained.

In order to achieve the above object, a lamp mounting structure to a bumper according to the present invention comprises a concave portion formed in a facing member of the bumper for receiving the lamp therein, and a tubular lamp mounting portion protrudingly provided on a rear side of the lamp. The concave portion has a base part at a bottom thereof in which an opening is formed. The lamp mounting portion has a configuration which is to be fitted into the opening of the concave portion, and upper and lower plate parts each having a flat outer surface. Upper and lower rib members are protrudingly formed on a rear surface of the base part of the concave portion along upper and lower edges of the base part which define the opening. The upper and lower rib members are arranged so as to come into contact with the outer surfaces of the upper and lower plate parts of the lamp mounting portion, respectively, when the lamp is inserted into the concave portion. The lamp thus formed is mounted to the concave portion by fixing means.

According to the lamp mounting structure described above, since the tubular lamp mounting portion is tightly fitted into the opening and the upper and lower rib members come into contact with the outer surfaces of the upper and lower plate parts of the lamp mounting portion, respectively, when the lamp is inserted into the concave portion, it becomes possible to completely seal between the lamp mounting portion and the base part so as to prevent muddy water from entering the concave portion. As a result, the muddy water in the bumper does not reach and soil the outer surface of the bumper. In addition, the mounting position of the lamp with respect to the concave portion is automatically set at the same time of inserting the lamp to the concave portion. This means that according to the present invention, it is no longer necessary to rely on the relationship between the small-diameter mounting holes and the screws as the conventional lamp mounting structure, when the mounting position of the lamp with respect to the concave portion is determined. As a result, assembly operability becomes also improved.

Further, it is preferable that the opening of the concave portion is formed into a rectangular shape, and the lamp mounting portion is also formed into a rectangular tubular shape having size and shape in cross section which are substantially the same as those of the opening. By doing so, positioning accuracy is further improved.

Furthermore, it is also preferable that the length of each rib members which is measured in the longitudinal direction of the rectangular opening is longer than that of each of the upper and lower edges of the base part which define the rectangular opening. In addition to this, it is also preferable that the width of the upper rib member which is measured in the protruding direction thereof is greater than that of the lower rib member in such a manner that the width of the lower rib member corresponds to the protruding length of the lamp mounting portion from the base part and the upper rib member protrudes over the end part of the lamp mounting portion. If constituted so, sealing ability between the base part of the concave portion and the lamp mounting portion and positioning accuracy between the lamp and the concave portion are further improved.

DETAILED DESCRIPTION OF THE PREFERRED EMBODIMENT

Figure 1:
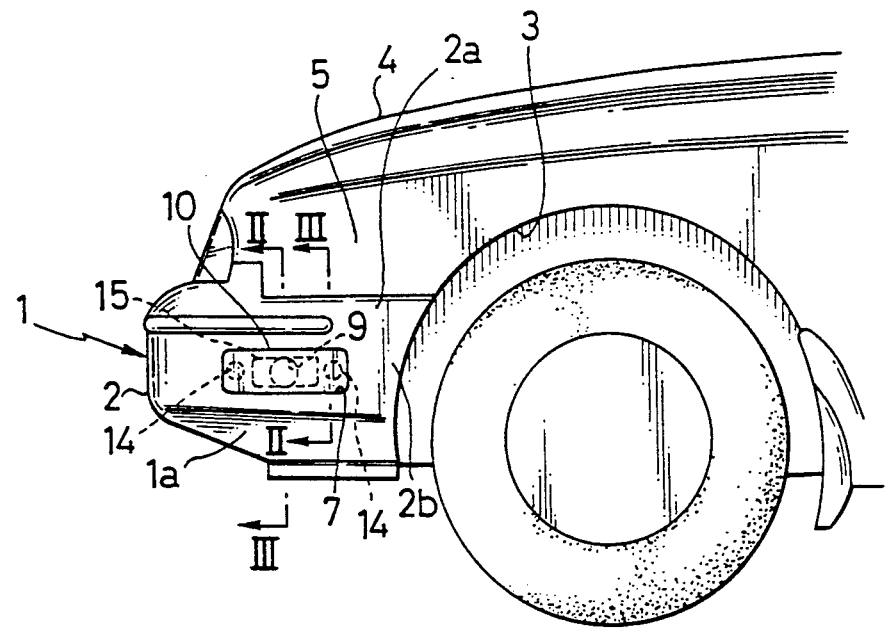
FIG. 1 is a side view of the front section of an automobile showing a conventional lamp mounting structure to a bumper.
Figure 2:
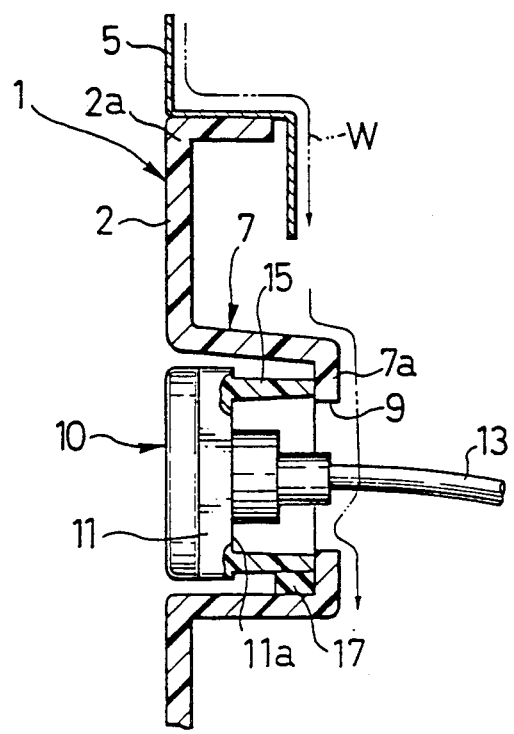
FIG. 2 is a sectional view along the section II—II in FIG. 1.
Figure 3:
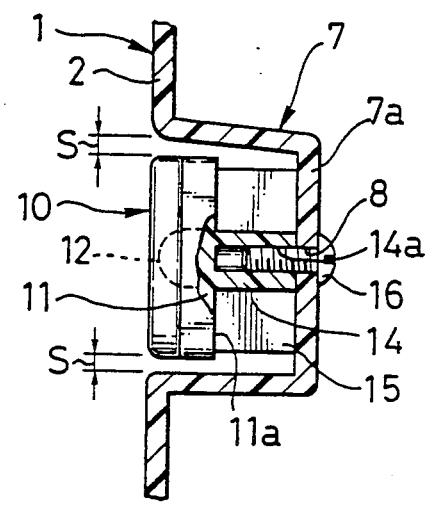
FIG. 3 is a sectional view along the section III—III in FIG. 1.

Referring now to the drawings, the preferred embodiment of the present invention will be described. In this case, it should be noted that the same reference numerals as those used in the description of the prior art denote the same components as those of the prior art.

Figure 4:
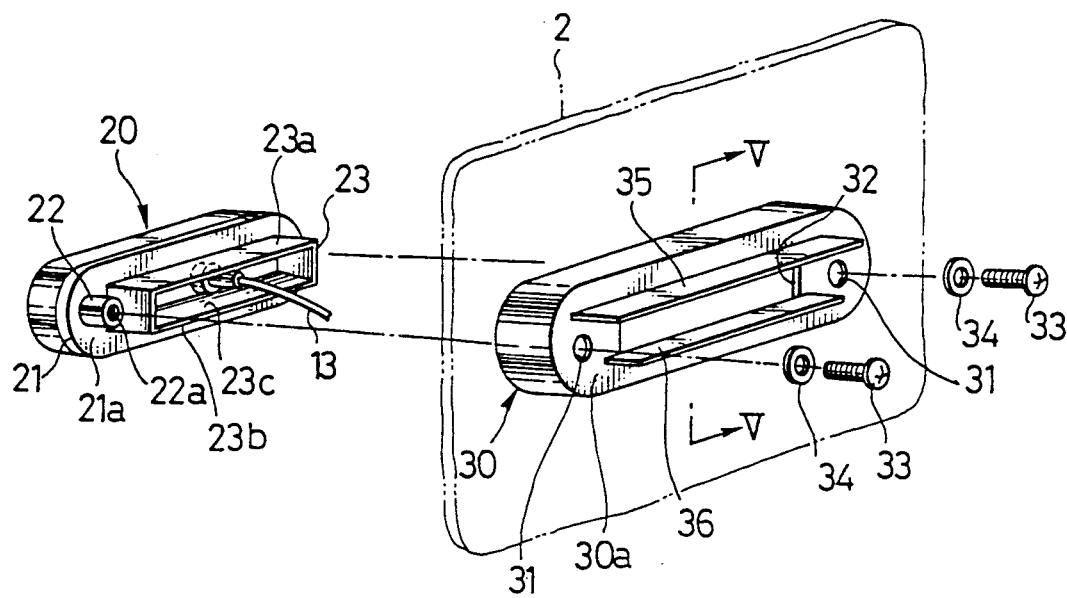
FIG. 4 is an exploded perspective view of an embodiment of a lamp mounting structure to a bumper according to the present invention.
Figure 5:
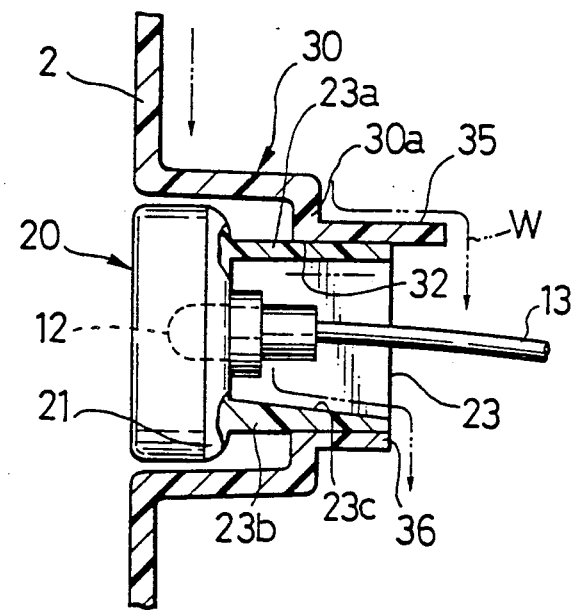
FIG. 5 is a sectional view along the section V—V in FIG. 4.

In FIG. 4 and FIG. 5, the reference numeral 20 denotes a lamp which comprises an elongated base plate portion 21 and a bulb 12 supported on the base plate portion 12. A wiring harness 13 is connected to the bulb 12. Two bosses 22 are integrally formed on a rear surface 21a of the base plate portion 21 with a certain space therebetween. Each of the bosses 22 has an axial screw holes 22a. Between the bosses 22 on the rear surface 21a of the base plate portion 21, a lamp mounting portion 23 having a rectangular tubular shape is integrally formed so as to surround the wiring harness 13 and protrude toward the rear direction of the lamp 20 over the tips of bosses 22. The lamp mounting portion 23 has upper and lower plate parts 23a, 23b each having a flat outer surface. The lower plate part 23b has an inner surface 23c which is inclined so as to slope gradually downward toward the protruding direction of the lamp mounting portion 23.

On the other hand, an elongated concave portion 30 for receiving the lamp 20 therein is formed in a bumper facer 2 at each of left and right sections of the bumper 1. The concave portion 30 has a base part 30a at the bottom thereof. On the base part 30a, there are formed two mounting holes 31 for receiving screws 33 therein through washers 34 at the positions corresponding to the screw holes 22a of the bosses 22 of the lamp 20. In addition, on the base part 30a, there is also formed a rectangular opening 32 between the mounting holes 31. The opening 32 has substantially the same size and shape as those of the cross section of the lamp mounting portion 23 in such a manner that the lamp mounting portion 23 of the lamp 20 is tightly fitted therein when the lamp 20 is inserted into the concave portion 30.

On the rear surface of the base part 30a, upper and lower ribs 35, 36 are protrudingly formed along the upper and lower edges of the base part 30a which define the opening 32. As clearly illustrated in FIG. 4, the length of each of the upper and lower ribs 35 and 36, which is measured in the longitudinal direction of the concave portion 30, is considerably greater than the longitudinal length of the opening 32, that is the length of each of the upper and lower edges. In this case, it is preferable that the length of the upper rib 35 is greater than that of the lower rib 36. Further, as clearly illustrated in FIG. 5, the width of the lower rib 36, which is measured in the protruding direction thereof, substantially corresponds to the difference between the protruding length of the lamp mounting portion 23 from the rear surface 21a of the base plate portion 21 of the lamp 20 and that of each boss 22. On the other hand, the width of the upper rib 35 is greater than that of the lower rib 33 in such a manner that the upper rib 35 protrudes over the protruding end of the lamp mounting portion 23. Furthermore, the diameter of each mounting hole 31 is larger than that of a stem portion of each screw 33.

The action of installing the lamp 20 to the concave portion 30 will now be explained. First, the lamp 20 is inserted into the concave portion 30 until the bosses 22 abut the base part 30a of the concave portion 30. In this case, the lamp mounting portion 23 of the lamp 20 is also inserted into the opening 32 of the concave portion 30. By doing this, at the time when the lamp mounting portion 23 is fitted into the opening 32, not only seal between the base part 30a and the lamp mounting portion 23 is achieved but also the top and bottom and front and back mounting positions and the mounting angle of the lamp 20 with respect to the concave portion 30 have automatically been set.

Specifically, since the opening 32 has substantially the same size and shape as those of the cross section of the tubular lamp mounting portion 23 and the upper and lower ribs 35 and 36 contacts with the upper and lower plate parts 23a and 23b, respectively, when the lamp mounting portion 23 is fitted into the opening 32, it is extremely difficult for muddy water which has entered the bumper facer 2 to penetrate into the concave portion 30 through the opening 32.

More specifically, according to the embodiment, the length of each of the upper and lower ribs 35 and 36 is greater than the longitudinal length of the opening 32, and the width of the upper rib 35 is greater than that of the lower rib 36 and the upper rib 35 protrudes over the protruding end of the lamp mounting portion 23. Accordingly, when the lamp mounting portion 23 of the lamp 20 is fitted into the opening, the outer surface of the upper plate part 23a of the protruding portion of the lamp mounting portion 23 tightly contact with the upper rib 35 and the protruding portion of the lamp mounting portion 23 is completely covered by the upper rib 35.

As a result, when the muddy water W flows down along the rear surface of the bumper facer 2, most of this muddy water W runs off the end of the upper rib 35, so that there is less possibility that the muddy water W flows toward the opening 32. Further, even when there is one portion of the muddy water W which flows from the end of the upper rib 35 along the lower surface of the upper rib 35, this muddy water cannot penetrate through the crevice between the lamp mounting portion 23 and the upper rib 35 into the concave portion 30 because the upper part 23a of the lamp mounting portion 23 contacts with the upper rib 35 as described above. Consequently, the muddy water W flows along the inner surface of the upper plate part 23a of the lamp mounting portion 23 and enters into only the lamp mounting portion 23. The muddy water W which has entered the lamp mounting portion 23 does not remain in the inside thereof but always flows to the outside, because the inner surface 21 of the lower part 23b of the lamp mounting portion 23 is inclined as described above. This muddy water W then drops off the end of the lower rib 36. For these reasons, the muddy water which has entered the fender panel does not penetrate into the concave portion 30 from the opening 32 and exits to the outer side of the bumper facer 2, so that the outer surface of the bumper facer 2 is not soiled.

In addition, since the opening 32 has substantially the same size and shape as those of the cross section of the tubular lamp mounting portion 23 and the protruding length of the lamp mounting portion 23 from the base plate portion 21 of the lamp is greater than that of each boss 22, the top and bottom and front and back mounting positions between the lamp 20 and concave portion 30 are automatically set when the lamp 20 is inserted into the concave portion 30. Further, since the upper and lower ribs 35, 36 contact the outer surfaces of the upper part 23a and the lower part 23b of the lamp mounting portion 23, respectively, as described above, the mounting angle of the lamp 20, that is the degree of horizontality of the lamp 20 with respect to the concave portion 30, is also set.

Thereafter, under the condition that the mounting position and the mounting angle of the lamp 20 with respect to the concave portion 30 is set in this manner, the screws 33 have only to be inserted from the rear of the base part 30a of the concave portion 30 into the mounting holes 31 through washers 34 and screwed into the screw holes 22a of bosses 22 to complete the mounting of the lamp 20 to the concave portion 30. In this case, the mounting position and the mounting angle of the lamp 20 with respect to the recess 22 are set by the relationship between the tubular lamp mounting portion 23 and the opening 32 including the upper and lower ribs 35, 36 and do not depend solely on the relationship between the diameter of the mounting hole 31 and the screw 33 as the prior art described above. As a result, the diameter of the mounting hole 31 can be made quite large with respect to the screw 33 so that the engagement of the screw 33 is easily accomplished.

Figure 6:
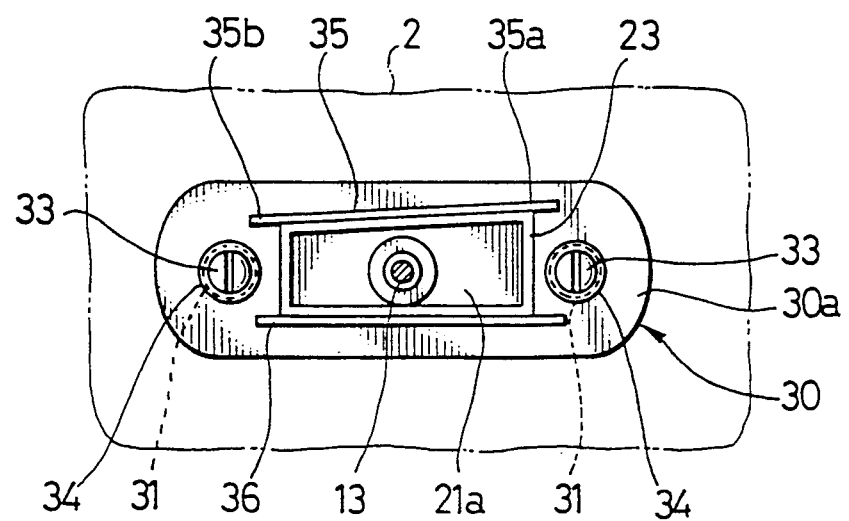
FIG. 6 is a rear view of a modification of the embodiment.

FIG. 6 illustrates a modification of the embodiment of the present invention described above. In this modification, one longitudinal end 35a of the upper rib 35 slants upward to a certain distance than the other end 35b thereof. In other word, the upper rib 35 is inclinedly provided. Further, the upper edge of the base part 30a which defines the opening 32 and the upper part 23a of the lamp mounting portion 23 also slants so as to correspond to the upper rib 35. According, the muddy water W which flows onto the upper rib 35 flows toward the other end 35b thereof and then drops off therefrom. The remaining structures of this modification are the same as those of the previous embodiment, therefore further explanation is omitted.

What is claimed is:

1. A lamp mounting structure for a bumper of an automobile, the bumper having a surface member, and the lamp having a rear side, comprising:

a concave portion formed in the surface member of the bumper for receiving the lamp therein, the concave portion having a base part at a bottom thereof in which an opening is formed, and the base part having a rear surface and upper and lower edges which define the opening;

a lamp mounting portion protrudingly provided on the rear side of the lamp, the lamp mounting portion having a configuration which is to be fitted into the opening of the concave portion, and the lamp mounting portion having upper and lower plate parts each having a flat outer surface;

upper and lower rib members protrudingly provided on the rear surface of the base part of the concave portion along the upper and lower edges thereof, the upper and lower rib members being adapted to come into contact with the outer surfaces of the upper and lower plate parts of the lamp mounting portion, respectively, when the lamp is inserted into the concave portion in such a manner that the lamp mounting portion is fitted into the opening; and means for fixing the inserted lamp to the concave portion.

2. A lamp mounting structure as claimed in claim 1, wherein the opening of the base part of the concave portion has a rectangular shape, and the lamp mounting portion includes a rectangular tubular member having substantially the same shape and size in cross section as those of the opening.

3. A lamp mounting structure as claimed in claim 2, wherein each of the upper and lower rib members has a rectangular shape having a length measured in the longitudinal direction of the rectangular opening and a width thereof measured in the protruding direction of the rib member, and the length of each rib members is greater than that of each of the upper and lower edges of the base part which define the rectangular opening.

4. A lamp mounting structure as claimed in claim 3, wherein the width of the upper rib member is greater than that of the lower rib member.

5. A lamp mounting structure as claimed in claim 4, wherein the lamp mounting portion has an end part which is protruded from the rear surface of the base part when the lamp mounting portion is fitted into the opening, in which the width of the lower rib member corresponds to the protruding length of the lamp mounting portion from the rear surface of the base part and the upper rib member protrudes over the end part of the lamp mounting portion.

6. A lamp mounting structure as claimed in claim 5, wherein the lower plate part of the tubular lamp mounting portion has an inner surface which is inclined so as to slope gradually downward toward the protruding direction of the lamp mounting portion.

7. A lamp mounting structure as claimed in claim 1, wherein the upper rib member has longitudinal ends, and one end of the rib member is upwardly located with respect to the other end in such a manner that the rib member is inclined in the longitudinal direction thereof, and the lamp mounting portion and opening are formed so as to correspond to the upper rib member.

8. A lamp mounting structure as claimed in claim 1, wherein the fixing means comprises at least one boss protrudingly formed on the rear side of the lamp, and a bolt to be screwed into the boss from the rear surface of the base part through a mounting hole formed on the base part.

9. A lamp mounting structure as claimed in claim 8, wherein the protruding length of the lamp mounting portion is greater than that of the boss in such a manner that the the boss abut onto the base part when the lamp mounting portion is fitted into the opening, to determine the mounting position of the lamp with respect to the concave portion in the insertion direction of the lamp.

10. A lamp mounting structure as claimed in claim 9, wherein the diameter of the mounting hole is larger than that of a stem portion of the bolt.

11. A lamp mounting structure for a bumper of an automobile, the bumper having a surface member, and the lamp having a rear side with a bulb mounted thereon, comprising:
a concave portion formed in the surface member of the bumper for receiving the lamp therein, the concave portion having a base part, at a bottom thereof in which an opening is formed; and
a lamp mounting portion protrudingly provided on the rear side of the lamp and extending from said rear side inwardly of said bumper, the lamp mounting portion having a configuration which is tightly fitted into the opening of the concave portion and partially protruded therefrom to seal between the base part of the concave portion and the lamp mounting portion of the lamp and position the lamp with respect to the concave portion when the lamp is inserted into the concave portion.

12. A lamp mounting structure for a bumper of an automobile, the bumper having a surface member, and the lamp having a rear side, comprising:
a concave portion formed in the surface member of the bumper for receiving the lamp therein, the concave portion having a base part at a bottom thereof in which an opening is formed, and the base part having a rear surface and upper and lower edges which define the opening;
a lamp mounting portion protrudingly provided on the rear side of the lamp, the lamp mounting portion having a shape which is tightly fitted into the opening of the concave portion and partially protruded therefrom, the lamp mounting portion having upper and lower plate parts each having a flat outer surface, and the upper and lower plate parts being arranged horizontally and parallel with each other; and
upper and lower rib members protrudingly formed on the rear surface of the base part of the concave portion along the upper and lower edges thereof, the upper and lower rib members being arranged horizontally and parallel with each other so as to come into contact with the outer surfaces of the upper and lower plate parts of the lamp mounting portion, respectively, when the lamp is inserted into the concave portion, and the protruding length of the upper rib member is greater than that of the lower rib member in such a manner that the upper rib member completely covers the protruded portion of the lamp mounting portion.

* * * * *